United States Patent
Li et al.

(10) Patent No.: US 12,096,243 B2
(45) Date of Patent: Sep. 17, 2024

(54) CONFIGURATION FOR MINIMIZATION OF DRIVE TEST IN WIRELESS COMMUNICATIONS

(71) Applicant: ZTE Corporation, Guangdong (CN)

(72) Inventors: Dapeng Li, Guangdong (CN); Yin Gao, Guangdong (CN); Jiren Han, Guangdong (CN)

(73) Assignee: ZTE Corporation, Shenzhen (CN)

( * ) Notice: Subject to any disclaimer, the term of this patent is extended or adjusted under 35 U.S.C. 154(b) by 372 days.

(21) Appl. No.: 17/401,740

(22) Filed: Aug. 13, 2021

(65) Prior Publication Data

US 2021/0377753 A1     Dec. 2, 2021

Related U.S. Application Data

(63) Continuation of application No. PCT/CN2019/075138, filed on Feb. 15, 2019.

(51) Int. Cl.
*H04W 24/02* (2009.01)
*H04W 24/08* (2009.01)
*H04W 24/10* (2009.01)

(52) U.S. Cl.
CPC ......... *H04W 24/02* (2013.01); *H04W 24/08* (2013.01); *H04W 24/10* (2013.01)

(58) Field of Classification Search
None
See application file for complete search history.

(56) References Cited

U.S. PATENT DOCUMENTS

| | | | |
|---|---|---|---|
| 2015/0208197 A1* | 7/2015 | Keskitalo | H04W 4/02 455/456.1 |
| 2016/0014627 A1* | 1/2016 | Johansson | H04W 24/10 455/67.11 |

(Continued)

FOREIGN PATENT DOCUMENTS

| | | |
|---|---|---|
| CN | 102595459 A | 7/2012 |
| CN | 103209425 A | 7/2013 |

(Continued)

OTHER PUBLICATIONS

3GPP, "Technical Specification; Universal Mobile Telecommunications Systems (UMTS); Universal Terrestrial Radio Access (UTRA) and Evolved Universal Terrestrial Radio Access (E-UTRA); Radio measurement collection for Minimization of Drive Tests (MDT); Overall description; Stage 2," ETSI TS 137 320 V15.0.0, Release 15, 29 pages, Jul. 2018.

(Continued)

*Primary Examiner* — Saumit Shah
(74) *Attorney, Agent, or Firm* — Perkins Coie LLP

(57) ABSTRACT

Techniques are described to improve minimization of drive test (MDT) related measurements. For example, a wireless communication method is described for receiving, by a first device, a measurement configuration for minimization of drive test (MDT) related measurement, sending, by the first device to a third device, a measurement result based on a first measurement configuration, where the measurement result includes a time stamp and a type of measurement result. The wireless communication method also includes sending, by the first device to a second device, a second measurement configuration and the type of measurement result. The first measurement configuration, second measurement configuration, and the type of measurement result are based on the measurement configuration for MDT.

20 Claims, 12 Drawing Sheets

(56) References Cited

U.S. PATENT DOCUMENTS

| | | | | |
|---|---|---|---|---|
| 2017/0295054 A1* | 10/2017 | Lee | ................... | H04L 41/06 |
| 2018/0041913 A1* | 2/2018 | Zhu | ................... | H04L 65/65 |
| 2021/0219156 A1* | 7/2021 | Hu | ................... | H04B 17/309 |

FOREIGN PATENT DOCUMENTS

| | | |
|---|---|---|
| CN | 103369558 A | 10/2013 |
| WO | 2013/135310 A1 | 9/2013 |
| WO | 2018224984 A1 | 12/2018 |

OTHER PUBLICATIONS

International Search Report and Written Opinion mailed on Oct. 30, 2019 for International Application No. PCT/CN2019/075138, filed on Feb. 15, 2019 (8 pages).

Samsung, "Use case for Minimization of Drive Testing," 3GPP TSG-RAN WG3 #101bis, Chengdu, China, R3-185727, 2 pages, Oct. 8-12, 2018.

Samsung, "Use case for Minimization of Drive Testing," 3GPP TSG-RAN WG3 #101bis, Chengdu, China, R3-186104, 4 pages, Oct. 8-12, 2018.

Chinese office action issued in CN Patent Application No. 201980091732.7, dated Apr. 29, 2023, 16 pages. English translation included.

3GPP, "3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 15)," 3GPP TS 37.320, V15.0.0, Jun. 2018, Technical Specification; 27 pages.

CATT, "Possible Measurement Types for MDT QoS Verification," 3GPP TSG RAN WG2 Meeting #77, R2-120772, Dresden, Germany, Feb. 6-10, 2012, 4 pages.

European Search Report for EP Patent Application No. 19915092.1, dated Feb. 10, 2022, 14 pages.

European Communication pursuant to Article 94(3) EPC issued in EP Patent Application No. 19915092.1, dated Mar. 4, 2024, 10 pages.

Chinese Notification to Complete Formalities of Registration issued in CN Patent Application No. 201980091732.7, dated Jan. 13, 2024, 4 pages. English translation included.

* cited by examiner

CONFIGURATION FOR MINIMIZATION OF DRIVE TEST IN WIRELESS COMMUNICATIONS

CROSS-REFERENCE TO RELATED APPLICATIONS

This application is a continuation of International Patent Application No. PCT/CN2019/075138, filed on Feb. 15, 2019, the contents of which are incorporated herein by reference in their entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for improving operations associated with minimization of drive test (MDT) or quality of experience (QoE) related measurements. A first exemplary embodiment discloses a wireless communication method that comprises receiving, by a first device, a measurement configuration for minimization of drive test (MDT) related measurement, sending, by the first device to a third device, a measurement result based on a first measurement configuration, and sending, by the first device to a second device, a second measurement configuration and the type of measurement result. In the wireless communication method of the first exemplary embodiment, the measurement result includes a time stamp and a type of measurement result, the first measurement configuration and the type of measurement result are based on the measurement configuration for MDT, and the second measurement configuration is based on the measurement configuration for MDT.

In some implementations of the first exemplary embodiment, the first device comprises a packet data convergence protocol (PDCP) layer, and the second device comprises a radio link control (RLC) protocol layer. In some implementations of the first exemplary embodiment, the type of measurement result includes a master node (MN) split measurement, a secondary node (SN) split measurement, a measurement between MN and SN, a central unit (CU) side measurement, a distribution unit (DU) side measurement, a measurement between CU and DU, a correlation measurement, a quality of service (QoS) flow identifier, a target 5G Qos identifier (5QI), or a mapped 5QI information.

In some implementations of the first exemplary embodiment, the first device includes a master node (MN) or a central unit (CU), the second device includes a secondary node (SN) or a distribution unit (DU), and the third device includes a measurement result collection device.

A second exemplary embodiment discloses a wireless communication method that comprises receiving, by a second device from a first device, a measurement configuration and a type of measurement result, and sending, by the second device to a third device, a measurement result based on the measurement configuration. In the wireless communication method of the first exemplary embodiment, the measurement configuration and the type of measurement result are based on another measurement configuration for minimization of drive test (MDT) related measurement, and the measurement result includes a time stamp and the type of measurement result.

In some implementations of the second exemplary embodiment, the first device comprises a packet data convergence protocol (PDCP) layer, and the second device comprises a radio link control (RLC) protocol layer. In some implementations of the second exemplary embodiment, the type of measurement result includes a master node (MN) split measurement, a secondary node (SN) split measurement, a measurement between MN and SN, a central unit (CU) side measurement, a distribution unit (DU) side measurement, a measurement between CU and DU, a correlation measurement, a quality of service (QoS) flow identifier, a target 5G Qos identifier (5QI), or a mapped 5QI information. In some implementations of the second exemplary embodiment, the first device includes a master node (MN) or a central unit (CU), the second device includes a secondary node (SN) or a distribution unit (DU), and the third device includes a measurement result collection device.

A third exemplary embodiment discloses a wireless communication method that comprises sending, by a first device to a second device, a configuration information for a quality of experience (QoE) related measurement, and receiving, by the first device from the second device, QoE measurement results based on the configuration information. In the wireless communication method of the third exemplary embodiment, the configuration information includes QoE measurement indicators, a QoE location information indicator, and a QoE measurement result storage indicator.

In some implementations of the third exemplary embodiment, the QoE measurement indicators indicates an application layer that performs measurement indicated by the QoE measurement indicators. In some implementations of the third exemplary embodiment, the QoE location information indicator indicates to the second device to include location information of the second device in the QoE measurement results. In some implementations of the third exemplary embodiment, the first device includes a base station, a network element, a core network element, or an application server, and the second device includes a user equipment. In some implementations of the third exemplary embodiment, the QoE measurement result storage indicator indicates to the second device to store the QoE measurements results in the second device.

A fourth exemplary embodiment discloses a wireless communication method that comprises receiving, by a second device from a first device, a configuration information for a quality of experience (QoE) related measurement, and sending, by the second device to the first device, QoE measurement results based on the configuration information. In the wireless communication method of the fourth exemplary embodiment, the configuration information includes QoE measurement indicators, a QoE location information indicator, and a QoE measurement result storage indicator.

In some implementations of the fourth exemplary embodiment, the QoE measurement indicators indicates an application layer that performs measurement indicated by the QoE measurement indicators. In some implementations of the fourth exemplary embodiment, the QoE location information indicator indicates to the second device to include location information of the second device in the QoE measurement results. In some implementations of the fourth exemplary embodiment, the first device includes a base station, a network element, a core network element, or an application server, and the second device includes a user equipment. In some implementations of the fourth exemplary embodiment, the QoE measurement result storage indicator indicates to the second device to store the QoE measurements results in the second device.

In yet another exemplary aspect, the above-described method is embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

I. Current Minimization of Drive Test (MDT) Measurement Process

Currently, minimization of drive test (MDT) faces several issues that are caused at least in part by the development of newer wireless technologies. For example, at least five technical questions are presented below that show that measurement operations associated with MDT can be improved.

Figure 4:
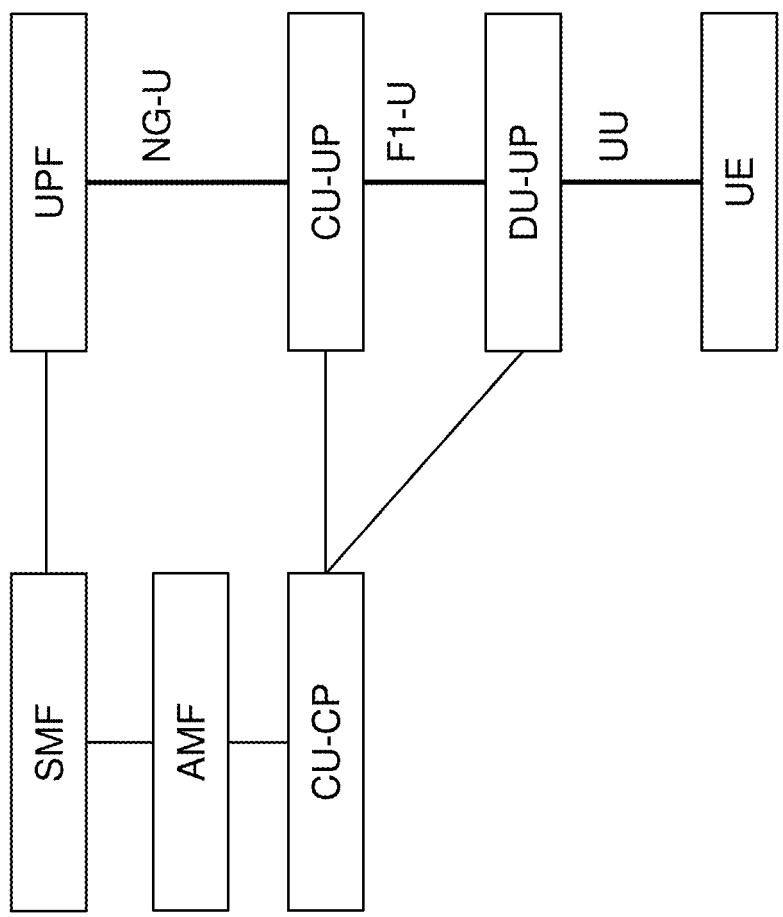
FIG. 4 shows a schematic diagram of the path of data packets transmitted by the user plane in the CU-DU architecture.

Technical question 1: When a network operator configures the minimization of drive test (MDT) measurement, it does not know the architecture used by the radio access network (RAN) side service. For example, the architecture includes central unit (CU)-distribution unit (DU) or Dual connectivity (DC). As shown in FIG. 4, the execution network element of the MDT measurement can be a CU user place (UP) or a DU UP. A CU may be considered a network element that includes a packet data convergence protocol (PDCP) layer and the DU may be considered a network element where the radio link control (RLC) protocol layer is located. But these network elements can measure only a part of the user data transmission. For example, a delay related measurement is obtained by a network element that includes the PDCP layer (e.g., CU or master node (MN)) by measuring the time delay of the transmission of a message sent by the CU to the DU; and the delay related measurement is obtained by a network node that includes the RLC protocol layer (e.g., DU or secondary node (SN)) by measuring the transmission latency of the air interface. If the network operator only gets some of the measured data, the operator cannot make a correct assessment of the quality of the data in the access network.

Technical question 2: The configuration message for the minimization of the signaling type (signaling based MDT) is sent first to the network element where the PDCP layer is located rather than to the network element where the RLC protocol is located. So if it is not explicitly stated in the measurement configuration, the network element on which the PDCP layer resides will be measured only in the network element where the PDCP layer is located, or only measured in the network element where the RLC protocol is located. Thus, the measured value can only evaluate a portion of the user's data transfer and cannot provide complete measurement results to help the operator perform a more detailed analysis.

Figure 5:
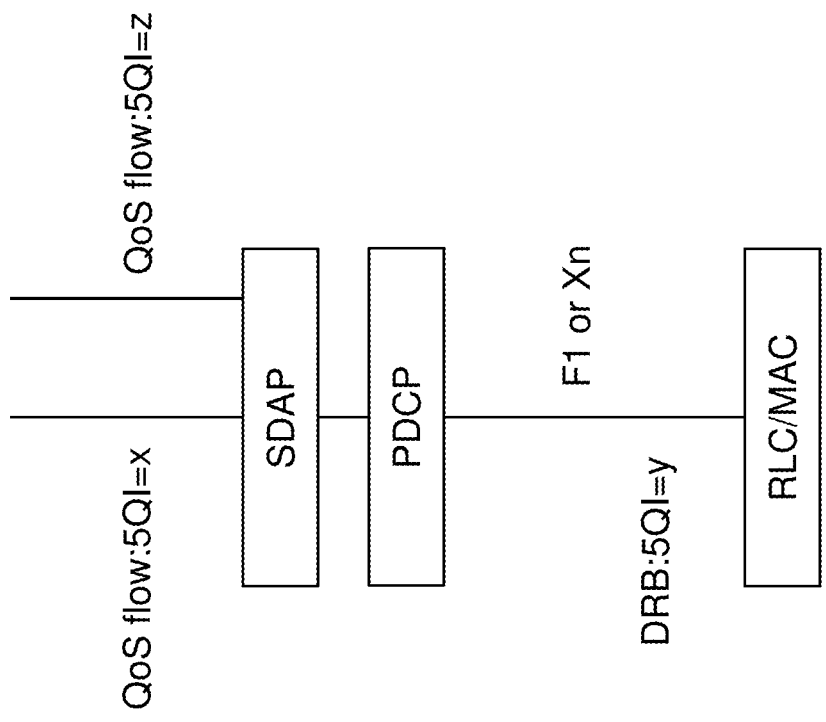
FIG. 5 shows an example scenario for requesting a 5G QoS indicator (5QI) type measurement.

Technical question three:

When the operator configures the MDT measurement for the UE, the required measurements cannot be directly obtained by execution network element of the MDT measurement and need to be obtained through indirect measurement. As shown in FIG. 5, it is possible for multiple QoS flow mapped to one DRB. QoS flow itself can have a 5G QoS Indicator (5QI) or Qos Class identifier (QCI) and the mapped DRB itself also can have 5QI or QCI. For example, the UE in FIG. 5 has two QoS flow, the 5G QoS Indicator (5QI) of one service flow is X, and the 5QI of the other service flow is Z. The two flows are mapped to the DRB, and this DRB has its own 5QI or QCI, and in the example shown in FIG. 5, the 5QI type of DRB is Y.

In this case, the measurement required by Operator is Qos Flow with 5QI=x, whereas RAN network only able to provide indirect measurements of DRB with 5QI=y. Current measurements techniques do not describe how the base station conduct and provides this kind of mapped QoS measurement.

Figure 6:
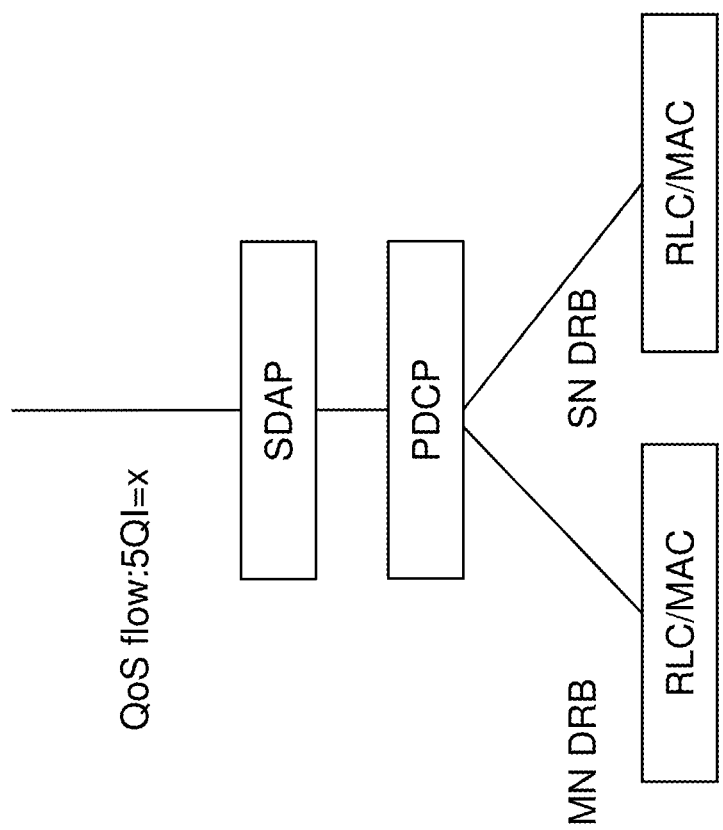
FIG. 6 shows quality of service (QoS) service flow in a dual connection split scenario.

Technical question 4: As shown in FIG. 6, the configuration of QoS in 5G supports a scenario of a split bearer in a dual connectivity structure. In this case, one service flow corresponds to two RLC bearers, one bearer on the MN and one bearer on the SN, which have different measurement results. However, when operators configure MDT measurements, they do not know that the base station will adopt a split dual connectivity architecture for UE's service. Therefore, the measurement result of the RLC bearer on the MN side and the measurement result of the RLC on the SN side and the measurement result of the network element where the PDCP layer is located should be related. Otherwise these measurements can be fragmented and Operator may not be able to utilize them to obtain a whole picture. Current measurements techniques do not describe how a network element configures a measurement in a split or dual connectivity architecture.

Figure 7:
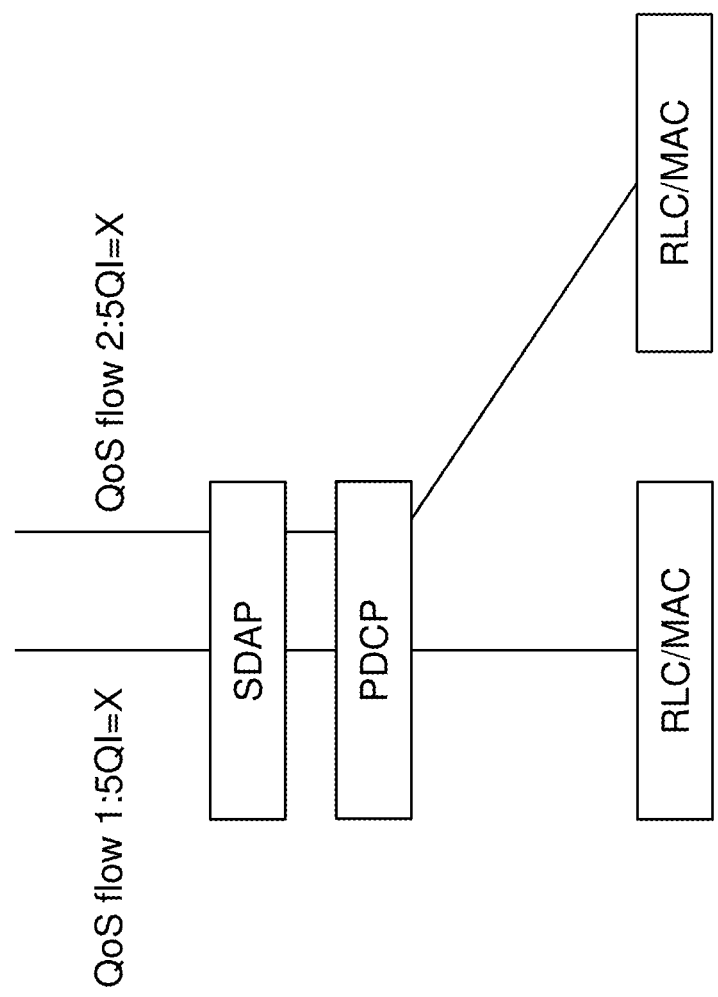
FIG. 7 shows an example scenario where a user equipment has two QoS service flows and the 5QI types of the two streams are the same.

Technical question 5: When configuring the MDT measurement, the operator can configure a measurement result according to the type of QoS. For example, a UE can have two QoS flows, and the 5QIs of the two flows can be of the same type. Therefore, operators may want to know the overall QoS situation. In the 4G scenario, since the user planes of all services use the same path, the distinction between QoS and the overall evaluation can be achieved, but such measurements in the NR phase can be problematic. As shown in FIG. 7, the UE has two QoS service flows at this point, and the 5QI types of the two streams are the same. So if you only provide the combined results of these two QoS service flows without providing information that they belong to different paths, it will be difficult for operators to tell which path is in question.

Technical question 6: With the introduction of 5G technology, more and more applications need to understand the actual experience of users using wireless devices. Currently, quality of experience (QoE) related measurements have not been adequately described.

II. Overview of 5G CU-DU Architecture and MDT

Information related to 5G's CU-DU architecture is described as follows.

Figure 1:
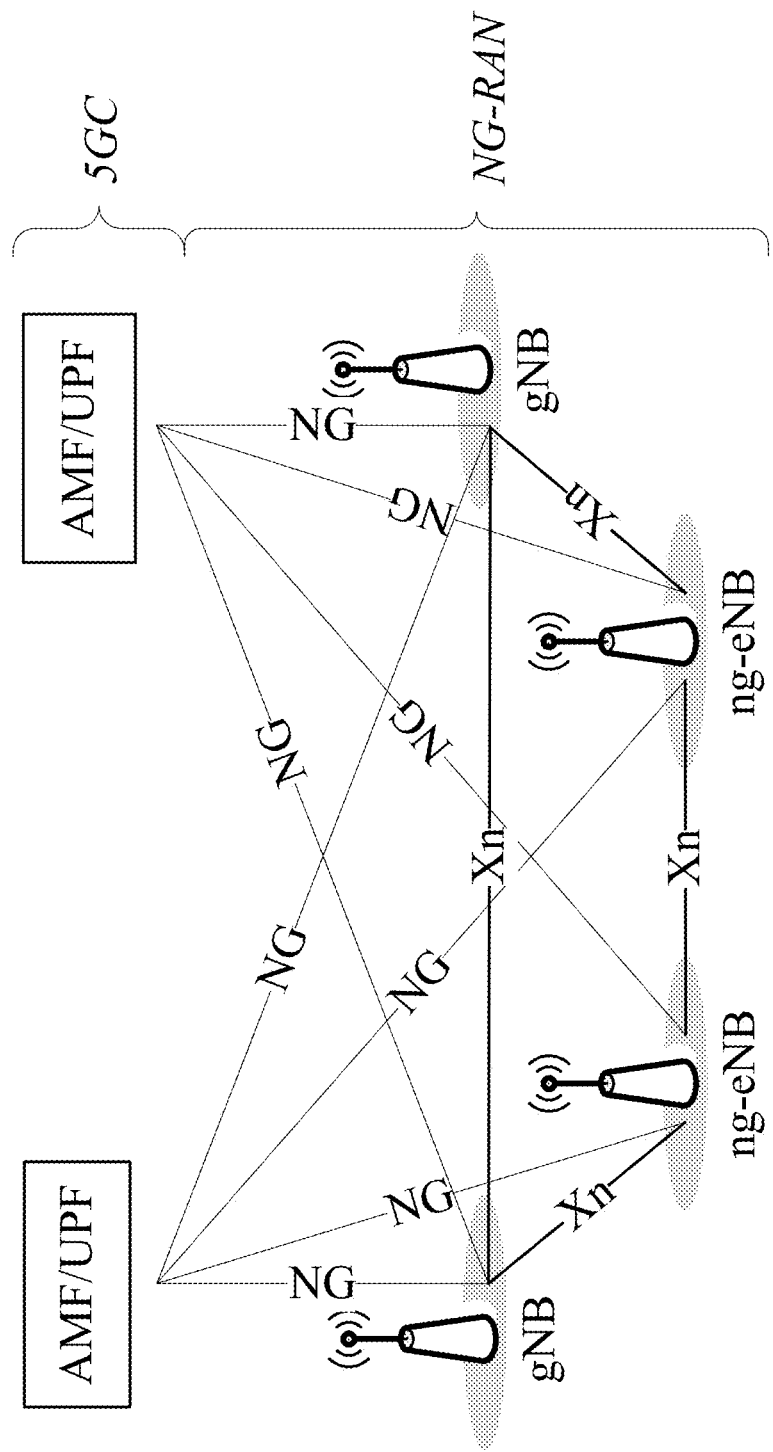
FIG. 1 is a schematic diagram of the 5G network.

FIG. 1 is a schematic diagram of the 5G network specified by the 3GPP TS 38.300 protocol. The 5G network in FIG. 1 includes a 5G core network (5GC or 5G core) and a 5G access network (NG-RAN). The network element of the 5G core network includes an access and mobility management unit (AMF) and a user plane function unit (UPF) in FIG. 1. The network element of the 5G access network includes a 5G enhanced eNB base station (ng-eNB) or a 5G base station. (gNB). The interface between the network element of the core network and the network element of the access network is an NG interface, and the interface between the network elements of the access network is an Xn interface.

Figure 2:
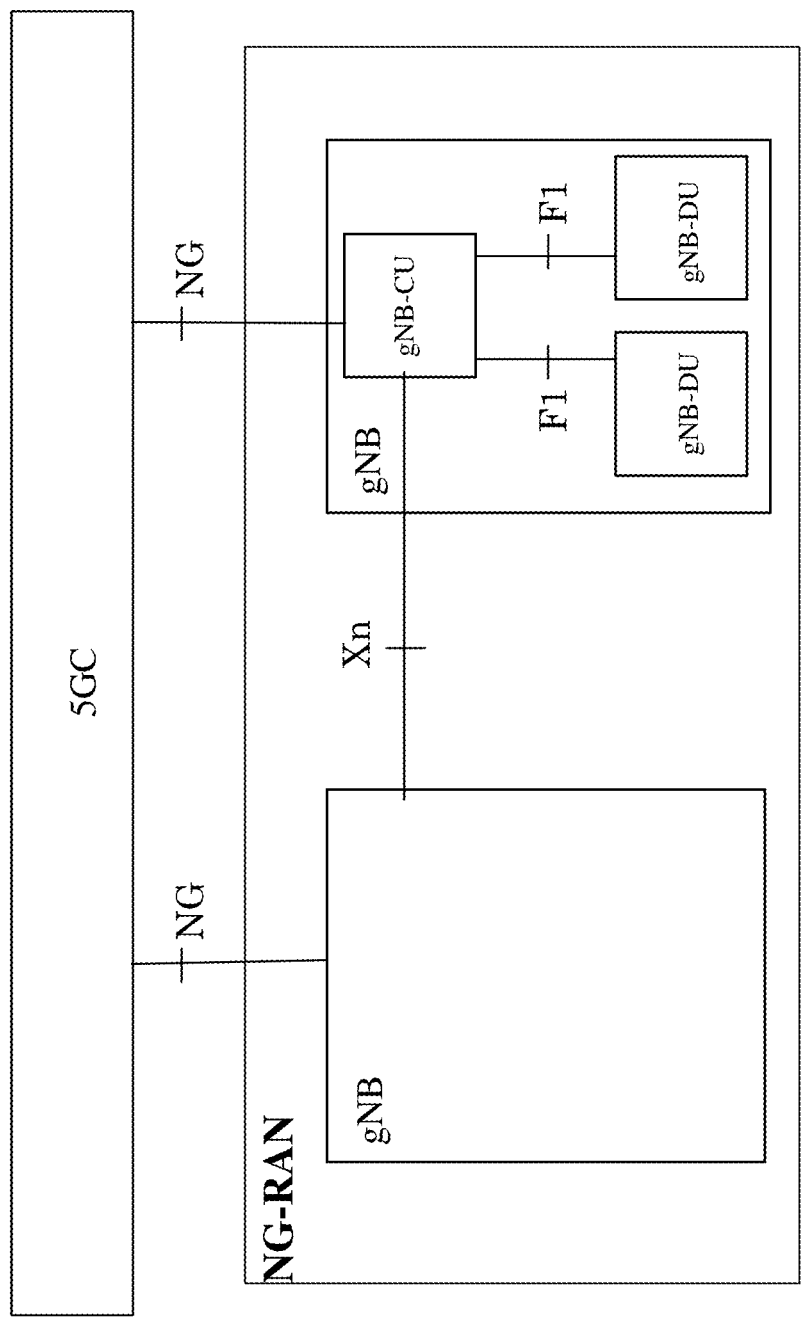
FIG. 2 provides an architectural diagram of the central unit (CU)-distribution unit (DU) functionality.

FIG. 2 provides an architectural diagram of the CU-DU functionality specified in the 3GPP TS 38.401 protocol. As shown in FIG. 2, the interface between the CU with different access network elements is the Xn interface, and the interface between the CU and DU in the network element is the F1 interface.

Figure 3:
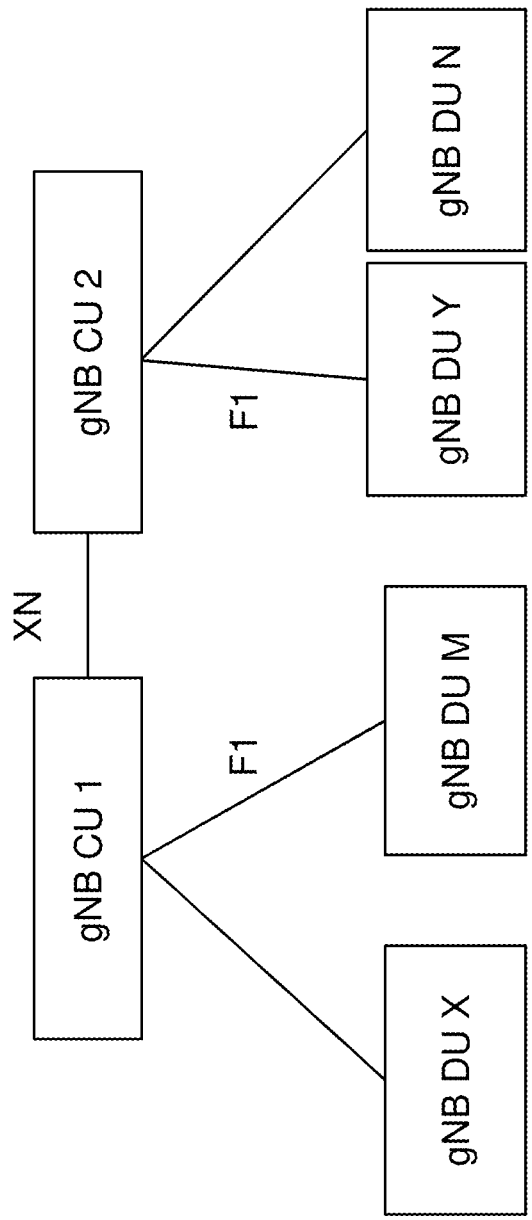
FIG. 3 is a schematic diagram of logical connections in an access network element.

FIG. 3 is a schematic diagram of logical connections in an access network element. If the CU is divided into a control plane CU (CU-C) and a user plane CU (CU-U), then the interface between the DU and the CU-C is an F1-C interface, DU and CU-U. The interface between the CU-Cs of different access network elements is an Xn-C interface, and the interface between CU-Us of different access network elements is an Xn-U interface. The interface between the CU-C and the core network element is an NG-C interface, and the interface between the CU-U and the core network element is an NG-U interface.

FIG. 4 shows a schematic diagram of the path of data packets transmitted by the user plane in the CU-DU architecture. As shown in the line segment in FIG. 4 that goes from UPF to CU-UP to DU-UP to UE, the downlink transmission means that the data packet is transmitted from the UPF of the core network element to the terminal UE. Uplink transmission refers to the UPF of data packets transmitted from the terminal UE to the core network element.

The technical overview for minimizing drive test is as follows.

In order to reduce the cost and complexity of operators using manual devices for manual road test, the Third Generation Partnership Projects (3GPP, Third Generation Partnership Projects) are used in the Universal Terrestrial Radio Access Network (UTRAN). Version 10 (Release-10) of B and Radio Network Controller (RNC) and Evolved Universal Terrestrial Radio Access Network (E-UTRAN) systems began to introduce minimization of drive test (MDT, Minimization of Drive Test) function. The core network (CN, Core Network) corresponding to the UTRAN includes a Home Subscriber Server (HSS), a Mobile Switching Centre Server (MSC Server), and a GPRS Support Node (SGSN, Serving GPRS Support Node, GPRS-General Packet Radio Service-General Packet Radio Service). The core network CN corresponding to the E-UTRAN includes a host user server HSS, a mobility management entity (MME, Mobile Management Entity), and the like. Minimize the drive test function. The user equipment (UE, User Equipment, or terminal) automatically collects measurement information and reports it to the radio access network (RAN, Radio Access Network) through the control plane (Control Plane). For the UTRAN system, the RNC is used. For the E-UTRAN system, the eNB is reported to the Trace Collection Entity (TCE) of the Operation and Maintenance System (OAM) through the radio access network for network optimization, such as discovering and resolving the network. Cover the issue.

MDT functions are divided into management-based MDT and signaling-based MDT. The activation process for management-based MDT is typically (in the case of E-UTRAN systems, the following are the same) Operation maintenance or network management system (OAM) sends a trace activation message containing the MDT configuration (trace Session activation) to eNB, eNB selects the appropriate UE within the area specified in the message and sends the MDT configuration information to the selected UE.

The activation process of the signaling-based MDT is sent by OAM A trace activation message containing the MDT configuration (trace Session activation) to HSS (Home subscriber Server) to activate the MDT measurement of the specified UE, HSS sends the MDT configuration information of the UE to mobility management entity (MME) where the MME sends the MDT configuration information of the UE to eNB, and eNB and eventually sends the MDT configuration information to the UE. Signaling-based MDT is usually identified by the international mobile user identification (IMUI), international Mobile subscriber Identity (IMSI), or the international mobile station equipment identity (IMEI) to specify a UE, or to add area information to limit the choice of UE. Management-based MDT and signaling-based MDT activation messages contain trace reference (trace Reference) information from OAM, including public land mobile network (PLMN) information, It consists of a mobile country code (MCC) and a mobile network code (MNC).

The description of the measurement statistics of packet loss and discarding is as follows:

The existing Layer two measurement has the measurement of packet loss and discard package, can refer to 3GPP protocol 36.314. The packet discard rate in the DL per QCI is used to count the packets that are not transmitted and discarded. Measurements are performed on the base station side and do not support minimizing drive tests. The Upward packet Drop measurement (Packet Loss Rate in the UL per QCI) statistics The receiving end in the base station side PDCP the final lost message. Supports minimal road measurements. Packet Uu Loss Rate in the DL per QCI collects packets that have been sent but failed on the base station side.

III. Exemplary Techniques for Configuration of MDT

Example 1: How to Correlate Measurements Results in Split Architecture

Example 1 can solve the issues described in technical questions 1 and 2 above. The exemplary operations of Example 1 can provide a method for minimizing the drive test configuration task break down, including the following exemplary steps:

Step 1: The PDCP layer is located in a network element that breaks up the MDT measurement configuration into multiple parts. For example, the network element that includes the PDCP layer can determine or generate multiple measurement configurations from a MDT measurement configuration received from a core network.

For example, a network operator may want to measure the UE's transmission delay on the RAN side. However, the operator may not know that the UE uses the CU-DU separation architecture or the MN-SN dual connectivity architecture before starting the MDT measurement. Therefore, the operator may only get a part of the measurement data, which can be inaccurate. Therefore, by performing the exemplary steps according to Example 1, the MDT measurement configuration for transmission delay can be split into three measurement configurations to obtain three measurement results, namely, the delay on the CU, the air interface delay on the DU, and the delay between the transmission between the CU and the DU. The measurement results can be provided in a measurement report, where the measurement results include timestamps that are used to correlate or associate the three measurements performed in accordance with the three measurement configurations. Thus, operators can more clearly analyze the problems that occur with each delay.

At Step 1, the network element comprising the PDCP layer can obtain a type of measurement result that is to be performed from the MDT measurement configuration. The information associated with the type of measurement result may include a plurality of measurements that are to be performed by the network element comprising the PDCP layer (or the network element comprising the RLC layer as described in Step two below). The type of measurement result can include a MN split measurement, a SN split measurement, a measurement between MN and SN, a CU side measurement, a DU side measurement, a measurement between CU and DU, a correlation measurement, a QoS flow identifier, a target 5QI, or a mapped 5QI information.

Step 2: The network element in which the PDCP layer is located sends the measurement configuration obtained from the MDT measurement configuration and type of measurement results information to the network element where the RLC protocol resides. The network element in which the PDCP layer is located can define a same measurement period in each split measurement configuration. For example, if the network element where the PDCP is located determines that the measurements should take place in three parts, then each part should perform the measurement within the same time period. Furthermore, a start time of each measurements should be aligned. In general, the network element that sends the measurement configuration can trigger measurement after sending the configuration message and the network element that receives measurement message should perform the measurement immediately after receiving the configuration message.

Step 3: The network element where the PDCP and the RLC protocol are located can start MDT related measurement at the same time using the example technique described in Step 2 above. The measurement results carry a timestamp. Each measurement cycle corresponds to a measurement result, and the measurement result can include a timestamp.

Step 4: The network element where the PDCP and the RLC protocol are located sends the measurement result to the measurement result collecting device. The measurement result collecting device may be a TCE device or a new measurement result collecting device in the 5G phase. In some embodiments, the measurement result collecting device may be a UE, SN, MN, CU, or DU.

Step 5: The measurement result collecting device combines the measurement results provided by the network element where the PDCP and the RLC protocol are located. In some embodiments, because all of the measurements contains UE's information (e.g., UE ID) and timestamp, then according to the UE information and the timestamp, the measurement result collecting device may associate or correlate the measurement result provided by the network element where the PDCP and the RLC protocol are located.

Example 2: Exemplary Solution for MDT Measurement Configuration and Measurement Result Correlation in the Case of Mapping Example 2 is used to solve the issue described in technical question three described above. The exemplary operations of Example 2 are described below:

Step 1: When the network element where the PDCP layer is located sends a measurement configuration determined or generated from the MDT measurement configuration to the network element where the RLC protocol is located, the type of the measurement result is also sent to the network element where the RLC protocol is located. This is done in part because only the network element where the PDCP layer is located can decide to perform MDT measurement. Then, in this case the QoS measurements which is required from OAM or core network cannot directly met. Thus, the network element where the PDCP layer is located should select a mapped QoS for the measurement and set the value of type of measurement result. In this way, the type of measurement result can be a mapped. This type of measurement results can be sent using existing messages in the XN, X2, F1 interface, or use new messages. The type of measurement results can also include information mapped to other service flows to the same DRB to the network element on which the RLC protocol resides.

FIG. 5 shows an example scenario for requesting a 5QI type measurement. The 5QI type measurement for the UE in the MDT configuration information request is sent by a network operator to the CU is X, but the CU finds that the measurement can only be performed by the DU. The DU can only measure the service status of the DRB. In example shown in FIG. 5, the requirement of OAM is measure 5QI=X, but the actually measured 5QI=Y. CU needs to provide mapped QoS information to mitigate this gap. In this case, the CU sends measurement configuration with 5QI=X to the DU, and mapped QoS information as another information to the DU. An example of the Information Element (IE) can ben see the table below.

| Measurement configuration to DU | 5QI = X |
|---|---|
| Mapped QoS Information | 5QI = Y |

After the DU receives configuration information and the type of measurement result, the measurement will be performed according to the case where the 5QI type is y.

Step 2: The network elements where the PDCP and the RLC protocol are located can start MDT measurement at the same time. The measurement results include a timestamp. Each measurement cycle can correspond to a measurement result, and the measurement result can include a timestamp.

Step 3: The network element where the PDCP and the RLC protocol are located sends the measurement result to the measurement result collecting device. The network element in which the PDCP and RLC protocols are located requires that the type of measurement result be carried in the measurement results. The measurement result collection equipment can be TCE equipment, but also is the 5G stage of the new measurement result collection equipment.

Step 4: The measurement result collecting device combines the measurement results provided by the network element where the PDCP and the RLC protocol are located. Based on the type of measurement results and information and timestamps, the measurement result collection device can correlate the measurement results provided by the network element in which the PDCP and RLC protocols are located.

As described in Step 1 of Example 2, the CU can also bring the information of the 5QI type to the DU to the DU, and the measurement collecting device can further evaluate the measurement result of the QoS flow of the 5QI type of the UE.

Example 3: Exemplary Solution for Correlation of MDT Measurement Results in Dual-Connection Split Scenario The operations for Example 3 are described below:

Step 1: When the network element on which the PDCP layer is located sends the measurement configuration determined from the MDT measurement configuration to the network element where the RLC protocol is located, the type of the measurement result is also sent to the network element where the RLC protocol resides.

The type of the measurement result can be a primary base station side split measurement type (MN split) or a secondary base station side split measurement type (SN split). This measurement type can use existing messages in the XN, X2, F1 interface, or use new messages.

FIG. 6 illustrates the exemplary operations of Example 3. For example, when the network operator sends the MDT configuration information to MN, the service flow 5QI type of the UE measurement is x, but MN finds that the service flow that needs to be measured at this point is actually using a dual-connectivity transport architecture and uses a detached host (split bearer). That is, part of the data for this service flow is passed on the RLC carrying (RLC bearer) of MN, and part of the data for this service flow is passed on the RLC bearer of SN. No part of the measurement results can be used to evaluate the content of the service flow. Therefore, the network element in which the PDCP layer resides requires that the type of measurement result also be sent to the network element where the RLC protocol resides.

Step 2: The network elements where the PDCP and the RLC protocol are located can start MDT measurement at the same time. The measurement results can include a timestamp. Each measurement cycle corresponds to a measurement result, and the measurement result can include a timestamp.

Step 3: The network element where the PDCP and the RLC protocol are located sends the measurement result to the measurement result collecting device. The network element in which the PDCP and RLC protocols are located may include the type of measurement result in the measurement results. The measurement result collection equipment can be TCE equipment, but also is the 5G stage of the new measurement result collection equipment.

Step 4: The measurement result collecting device combines the measurement results provided by the network element where the PDCP and the RLC protocol are located. Based on the type of measurement results and information and timestamps, the measurement result collection device can correlate the measurement results provided by the network element in which the PDCP and RLC protocols are located. Since the measurement results of different service paths can be distinguished by the type of measurement results at this time, the measurement collection device can analyze different measurement results according to the service paths.

Example 4: Exemplary Solution to Dual Connection Split-Scenario Multiple Identical QoS Type Business Flow Example 4 can be used to solve the issue described in technical question five. The exemplary operations for Example 4 can be performed as follows:

Step 1: The PDCP layer is located in a network element that breaks up the MDT measurement configuration into multiple parts. QoS flows 1 and 2 can be measured on the same network element. However, the measured value should be labeled with the service path information. If the measurement results of QoS Flow 1 and 2 are combined, even if the network element in which the RLC protocol is located is divided into different SN split types, it may still not be possible to distinguish between measurements that belong to two different paths. Thus, the type of measurement result information can include the service path information, which can include the QOS flow identifier.

Step 2: When the network element on which the PDCP layer is located sends the measurement configuration determined from the MDT measurement configuration to the network element where the RLC protocol is located, the type of the measurement result is also sent to the network element where the RLC protocol resides.

As shown in FIG. 7, the type of the measurement result can include QoS flow information.

Step 3: The network element where the PDCP and RLC protocols are located can perform the MDT measurement at the same time. The measurement results can include a time stamp. Each measurement cycle corresponding to measurement result can include a time stamp. Each network element may generate different measurement reports based on the type of measurement results included in QoS flow.

Step 4: The network elements where the PDCP and the RLC protocol are located send the measurement result to the measurement result collecting device. The network element in which the PDCP and RLC protocols are located may include the type of measurement result in the measurement results. The measurement result collection equipment can be TCE equipment, but also is the 5G stage of the new measurement result collection equipment.

Step 5: The measurement result collecting device combines the measurement results provided by the network element where the PDCP and the RLC protocol are located. Based on the type of measurement results and information and timestamps, the measurement result collection device can correlate the measurement results provided by the network element in which the PDCP and RLC protocols are located. Since the measurement results of different paths can be distinguished by the type of measurement results at this time, the measurement result collection device can analyze different measurement results according to the path.

Example 5: Solution for Correlating MDT Measurement Results

The exemplary methods described in Examples 1 to 4 above may include a network element where the PDCP layer is located generates or determines the measurement configurations from the MDT measurement configuration and sends a control plane message to the network element where the RLC protocol is located. The control plane message includes the measurement configuration determined from the MDT measurement configuration and the type of measurement result obtained from the MDT measurement configuration. After the network element of the RLC protocol performs the MDT related measurement, the measurement result is reported to the measurement result collection device. The measurement results may include the type of measurement result and timestamp when the measurements were performed. The measurement results can be correlated and evaluated by the type of measurement result and the time stamp information of the measurement report.

In Example 5, the network entity that includes the RLC protocol can send its measurement results to the network element where the PDCP layer is located. The network element in the PDCP layer merges its measurement results with the measurement results obtained from the network entity that includes the RLC protocol. The network entity that includes the PDCP layer sends the merged measurement results to the measurement result collection device.

Example 6: A Quality of Experience (QoE) Minimization Measurement Configuration Method Example 6 describes operations to perform a QoE related measurement.

Step 1: Base station receives from a network side network element a QoE related MDT measurement configuration information. The base station can be a 5G NR base station or a 4G LTE base station, and the network side network elements may include core network element (such as AMF, UPF, NWDAF), or an application server.

Step 2: The base station sends the QoE minimized drive test configuration information to the user terminal (UE). The QoE measurement configuration information can comprise one or a combination of the following information:
 QoE measurement indicators,
 QoE location information indicator, and
 QoE measurement result storage indicator The QoE measurement indicators (e.g., indexes) includes the measurement index of the application layer to the QoE, such as the measurement index of the QoE specified in the 3GPP protocol TS 26.247, or the index specified by other application layers. The QoE location information indicator refers to the requirement that QoE's measurement report should carry detailed location information (e.g., GPS location information).

The QoE location information indicator informs the UE-side application layer responsible for measuring the QoE to add accurate location information to the measurement report. For example, the terminal may have a global positioning system (GPS) device and may have latitude and longitude information. The UE can use the location information as part of the measurement report when performing the QoE related measurement. The combination of the measurement result and the location information may be based on the measurement period. For example, the UE may measure the QoE information for 10 minutes. During this time, the UE may generate a measurement report every minute, which is called the measurement period. The UE can bind the measurement result of each measurement period to the current location information of the UE. The UE can also combine the location information with the complete measurement result. The location information is added to the measurement report.

The measurement result storage indicator indicates to the UE whether it should save or store the QoE measurement results according to the configuration when the configuration is received.

Configurations can include logging requirements for QoE measurements, including:
 The type of service that is logged,
 The size of the measurement results,
 The time at which the measurement results are saved,
 The reporting method of the measurement result (for example, whether to use the RRC UE information process or other RRC messages)
 The path reported by the measurement results (SRB2, SRB4 or otherwise).

Step 3: The terminal performs QoE measurement and reports the measurement to the base station.

When the access layer of the terminal receives the configuration, it sends the configuration to the non-access layer or application layer of the terminal. The non-access stratum (NAS) or application layer of the terminal performs QoE measurement according to the configuration provided by the base station. Measurements are made for QoE metrics, which are not limited to the measurements specified in 3GPP Protocol TS 26.247. For example, an application layer service can have a defined indicator for the video service, and can be measured according to the indicator defined by the service.

Where the measurement configuration contains QoE location information indicator, the terminal sends this configuration to the non-access layer or application layer of the terminal. The NAS or application layer of the terminal can attempt to obtain accurate location information when measuring the QoE parameter, for example, the latitude and longitude information provided by the terminal GPS can be obtained. This information will be carried in the QoE measurement parameters.

When the terminal receives the recorded QoE measurement, it performs the recording and reporting according to the configuration. If the configuration is not received, the recording of the terminal may send the measurement result to the base station through the measurement report of the RRC. When receiving the configuration, the terminal saves the measurement result in the terminal. After the collection is completed, the measurement report is reported to the base station according to the request of the network. For example, the base station can obtain measurement reports from the terminal using UE information. The base station that obtains the measurement report may not be the base station at the time of measurement. For example, after a base station measurement is completed, the measurement report is stored in the terminal. It is reported to other base stations when the terminal accesses other base stations.

Step 4: The base station reports the QoE measurement to the network side network element. This part refers to Example 7 below.

Example 7: QoE Measurement Results Reported to the Application Layer

Example 7 describes operations that can solve the technical issue of how to report the QoE measurement result to the application layer and add the UE location information to the measurement result. Example 7 describes three exemplary methods for reporting QoE measurement results, including:

Method 1: The base station side reports the QoE measurement result to the core network through the user plane of the NG interface, and then the application layer obtains the QoE measurement result from the core network. A new frame type is introduced on the NG interface for reporting the QoE measurement result on the user plane.

Methods 2: The QoE measurement results are reported to the tracking collection entity (TCE) on the base station side, and the QoE measurement results are obtained from the core network by the application layer.

Method 3: The base station side reports the QoE measurement result to the application layer in the form of a data packet.

The UE location information described above can be detailed latitude and longitude information obtained from a GPS.

Figure 8:
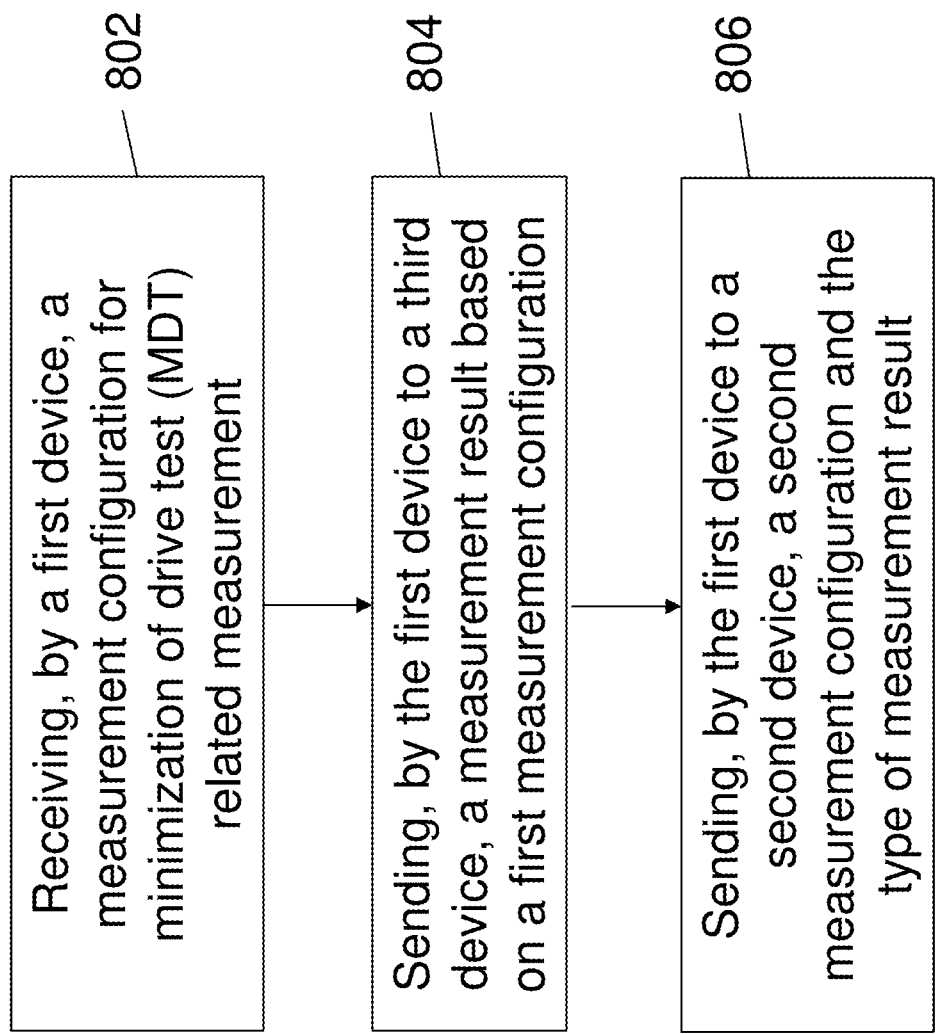
FIG. 8 shows an exemplary flowchart for processing a measurement configuration for MDT related measurement.

FIG. 8 shows an exemplary flowchart for processing a measurement configuration for MDT related measurement. At the receiving operation 802, a first device receives a measurement configuration for minimization of drive test (MDT) related measurement. At the sending operation 804, the first device sends to a third device, a measurement result based on a first measurement configuration, where the measurement result includes a time stamp and a type of measurement result, where the first measurement configuration and the type of measurement result are based on the measurement configuration for MDT. At the sending operation 806, the first device sends to a second device, a second measurement configuration and the type of measurement result, where the second measurement configuration is based on the measurement configuration for MDT.

In some embodiments, the first device comprises a packet data convergence protocol (PDCP) layer, and the second device comprises a radio link control (RLC) protocol layer.

In some embodiments, the type of measurement result includes a master node (MN) split measurement, a secondary node (SN) split measurement, a measurement between MN and SN, a central unit (CU) side measurement, a distribution unit (DU) side measurement, a measurement between CU and DU, a correlation measurement, a quality of service (QoS) flow identifier, a target 5G Qos identifier (5QI), or a mapped 5QI information.

In some embodiments, the first device includes a master node (MN) or a central unit (CU), the second device includes a secondary node (SN) or a distribution unit (DU), and the third device includes a measurement result collection device.

Figure 9:
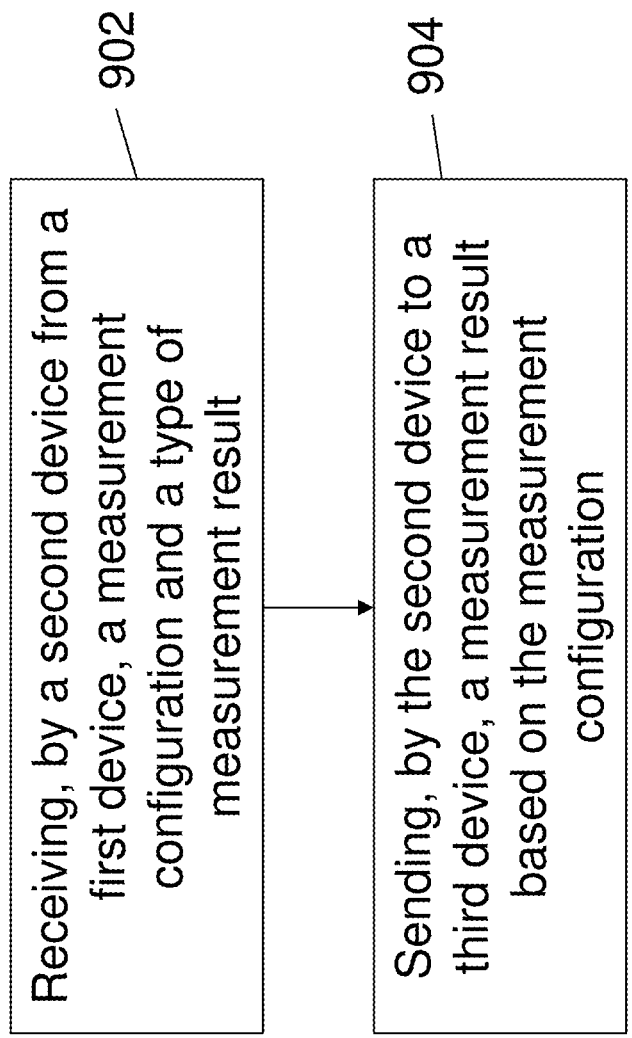
FIG. 9 shows an exemplary flowchart for processing a measurement configuration received from a network element.

FIG. 9 shows an exemplary flowchart for processing a measurement configuration received from a network element.

At the receiving operation 902, a second device receives from a first device, a measurement configuration and a type of measurement result, where the measurement configuration and the type of measurement result are based on another measurement configuration for minimization of drive test (MDT) related measurement.

At the sending operation 904, the second device sends to a third device, a measurement result based on the measurement configuration, where the measurement result includes a time stamp and the type of measurement result.

In some embodiments, the first device comprises a packet data convergence protocol (PDCP) layer, and the second device comprises a radio link control (RLC) protocol layer.

In some embodiments, the type of measurement result includes a master node (MN) split measurement, a secondary node (SN) split measurement, a measurement between MN and SN, a central unit (CU) side measurement, a distribution unit (DU) side measurement, a measurement between CU and DU, a correlation measurement, a quality of service (QoS) flow identifier, a target 5G Qos identifier (5QI), or a mapped 5QI information.

In some embodiments, the first device includes a master node (MN) or a central unit (CU), the second device includes a secondary node (SN) or a distribution unit (DU), and the third device includes a measurement result collection device.

Figure 10:
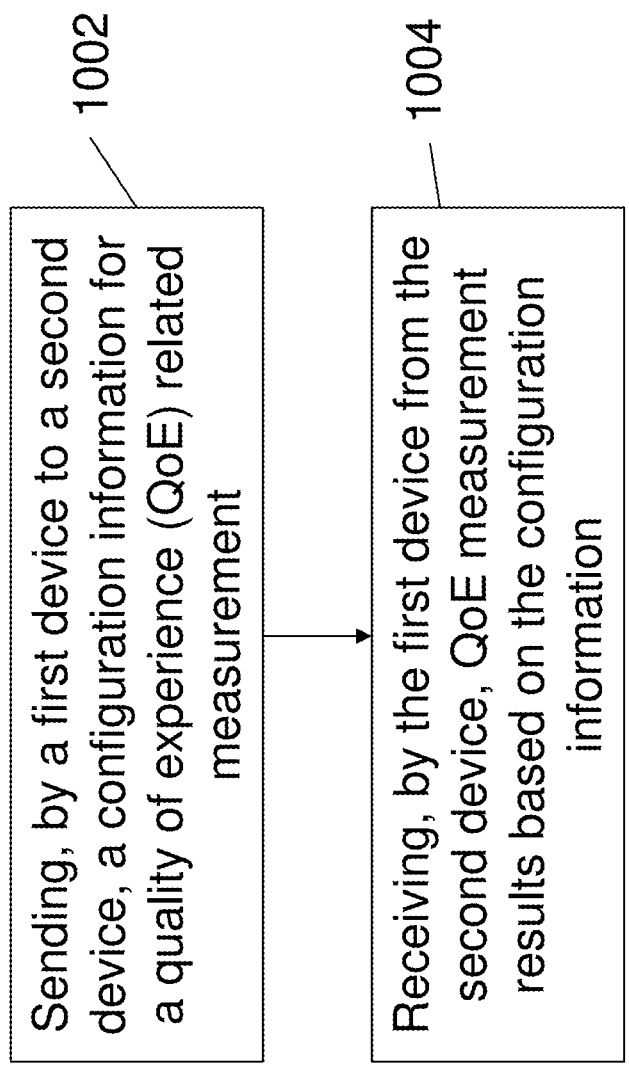
FIG. 10 shows an exemplary flowchart for receiving a quality of service (QoE) related measurement result based on a configuration information.

FIG. 10 shows an exemplary flowchart for receiving a QoE related measurement result based on a configuration information. At the sending operation 1002, a first device sends to a second device, a configuration information for a quality of experience (QoE) related measurement, where the configuration information includes QoE measurement indicators, a QoE location information indicator, and a QoE measurement result storage indicator. At the receiving operation 1004, the first device receives from the second device, QoE measurement results based on the configuration information.

In some embodiments, the QoE measurement indicators indicates an application layer that performs measurement indicated by the QoE measurement indicators. In some embodiments, the QoE location information indicator indicates to the second device to include location information of the second device in the QoE measurement results. In some embodiments, the first device includes a base station, a network element, a core network element, or an application server, and the second device includes a user equipment. In some embodiments, the QoE measurement result storage indicator indicates to the second device to store the QoE measurements results in the second device.

Figure 11:
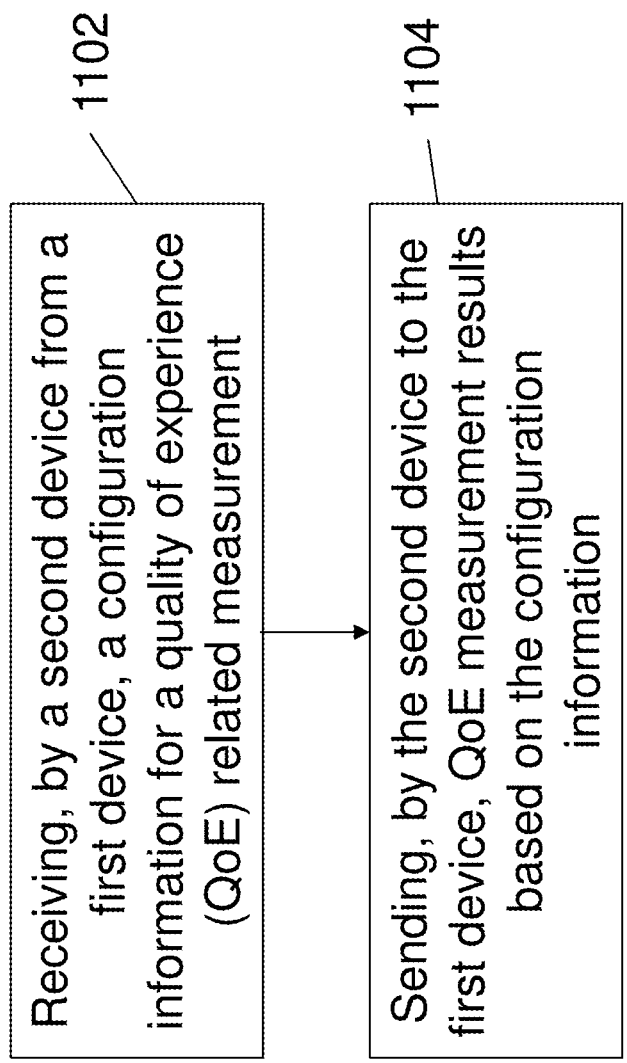
FIG. 11 shows an exemplary flowchart for sending a QoE related measurement configuration based on a configuration information.

FIG. 11 shows an exemplary flowchart for sending a QoE related measurement configuration based on a configuration information. At the receiving operation 1102, a second device receives from a first device, a configuration information for a quality of experience (QoE) related measurement, where the configuration information includes QoE measurement indicators, a QoE location information indicator, and a QoE measurement result storage indicator. At the sending operation 1104, the second device sends to the first device, QoE measurement results based on the configuration information.

In some embodiments, the QoE measurement indicators indicates an application layer that performs measurement indicated by the QoE measurement indicators. In some embodiments, the QoE location information indicator indicates to the second device to include location information of the second device in the QoE measurement results. In some embodiments, the first device includes a base station, a network element, a core network element, or an application server, and the second device includes a user equipment. In some embodiments, the QoE measurement result storage indicator indicates to the second device to store the QoE measurements results in the second device.

Figure 12:
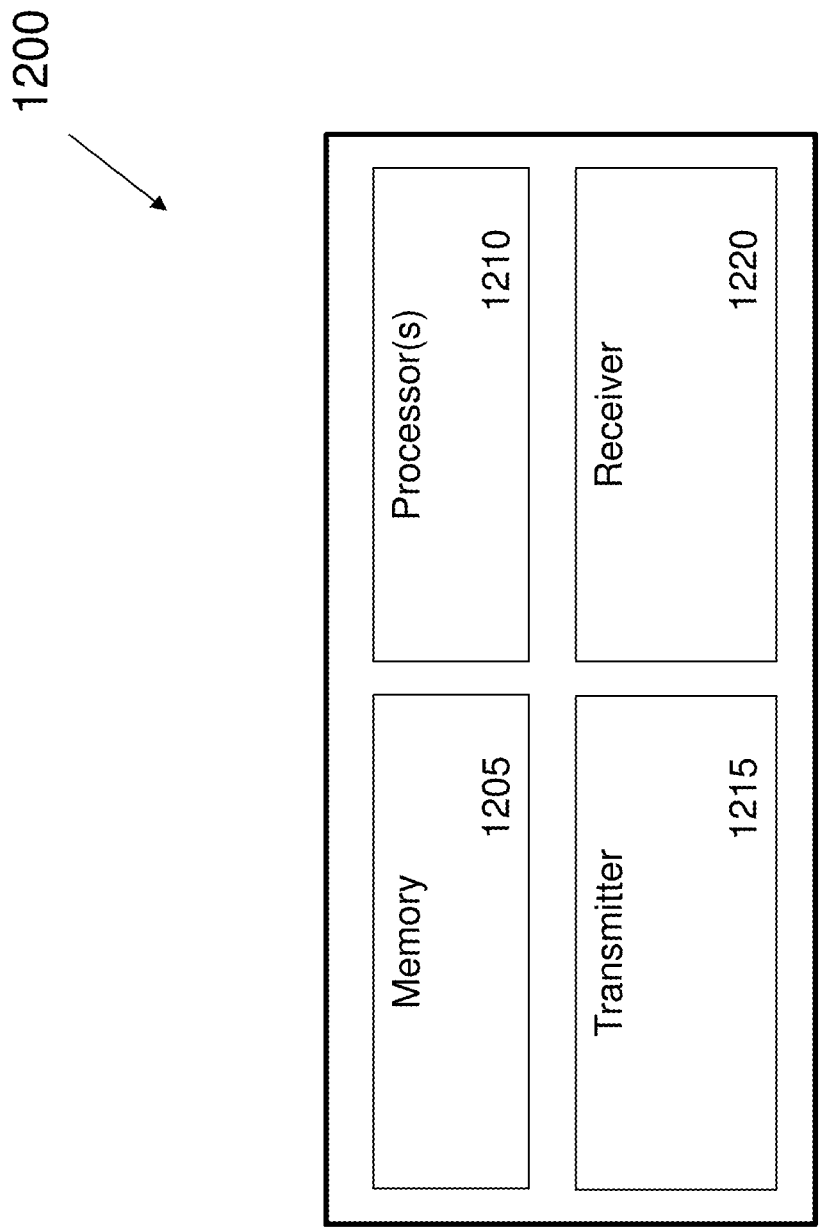
FIG. 12 shows an exemplary block diagram of a hardware platform that may be a part of a network element or a user equipment.

FIG. 12 shows an exemplary block diagram of a hardware platform 1200 that may be a part of a network element or a user equipment. The hardware platform 1200 includes at least one processor 1210 and a memory 1205 having instructions stored thereupon. The instructions upon execution by the processor 1210 configure the hardware platform 1200 to perform the operations described in FIGS. 1 to 11 and in the various embodiments described in this patent document. The transmitter 1215 transmits or sends information or data to another network element or user equipment. For example, a network element transmitter can send a configuration information to another network element. The receiver 1220 receives information or data transmitted or sent by another network element. For example, a user equipment can receive a QoE related configuration information from a network element.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
receiving, by a first device, a measurement configuration for minimization of drive test (MDT) related measurement;
sending, by the first device to a measurement result collection device, a measurement result based on a first measurement configuration determined based on the measurement configuration for MDT related measurement,
wherein the measurement result includes a time stamp and a type of measurement result to correlate measurement results obtained by at least one of the first device or a second device based on the time stamp and the type of measurement result,
wherein the first measurement configuration and the type of measurement result are based on the measurement configuration for MDT; and
sending, by the first device to the second device, a second measurement configuration determined based on the measurement configuration for MDT related measurement, and the type of measurement result,
wherein the second measurement configuration is based on the measurement configuration for MDT related measurement,
wherein the measurement result is split into a plurality of parts of the measurement result obtained based on a plurality of parts of the measurement configuration, and a plurality of measurements corresponding to the plurality of parts of the measurement result is performed within a same time period.

2. The method of claim 1,
wherein the first device comprises a packet data convergence protocol (PDCP) layer, and
wherein the second device comprises a radio link control (RLC) protocol layer.

3. The method of claim 1, wherein the type of measurement result includes a master node (MN) split measurement, a secondary node (SN) split measurement, a measurement between MN and SN, a central unit (CU) side measurement, a distribution unit (DU) side measurement, a measurement between CU and DU, a correlation measurement, a quality of service (QoS) flow identifier, a target 5G Qos identifier (5QI), or a mapped 5QI information.

4. The method of claim 1,
wherein the first device includes a master node (MN) or a central unit (CU), and
wherein the second device includes a secondary node (SN) or a distribution unit (DU).

5. A wireless communication method, comprising:
receive, by a second device from a first device, a measurement configuration and a type of measurement result,
wherein the measurement configuration and the type of measurement result are based on another measurement configuration for minimization of drive test (MDT) related measurement; and
sending, by the second device to a measurement result collection device, a measurement result based on the measurement configuration,
wherein the measurement result includes a time stamp to correlate measurement results obtained by at least one of the first device or the second device based on the time stamp and the type of measurement result, and the type of measurement result,
wherein the measurement result is split into a plurality of parts of the measurement result obtained based on a plurality of parts of the measurement configuration, and a plurality of measurements corresponding to the plurality of parts of the measurement result is performed within a same time period.

6. The method of claim 5,
wherein the first device comprises a packet data convergence protocol (PDCP) layer, and
wherein the second device comprises a radio link control (RLC) protocol layer.

7. The method of claim 5, wherein the type of measurement result includes a master node (MN) split measurement, a secondary node (SN) split measurement, a measurement between MN and SN, a central unit (CU) side measurement, a distribution unit (DU) side measurement, a measurement between CU and DU, a correlation measurement, a quality of service (QoS) flow identifier, a target 5G Qos identifier (5QI), or a mapped 5QI information.

8. The method of claim 5,
wherein the first device includes a master node (MN) or a central unit (CU), and
wherein the second device includes a secondary node (SN) or a distribution unit (DU).

9. An apparatus for wireless communication comprising a processor, configured to implement a method comprising:
receive, by a first device, a measurement configuration for minimization of drive test (MDT) related measurement;

send, by the first device to a measurement result collection device, a measurement result based on a first measurement configuration determined based on the measurement configuration for MDT related measurement,
wherein the measurement result includes a time stamp, and a type of measurement result to correlate measurement results obtained by at least one of the first device or a second device based on the time stamp and the type of measurement result,
wherein the first measurement configuration and the type of measurement result are based on the measurement configuration for MDT; and
send, by the first device to the second device, a second measurement configuration determined based on the measurement configuration for MDT related measurement, and the type of measurement result,
wherein the second measurement configuration is based on the measurement configuration for MDT related measurement,
wherein the measurement result is split into a plurality of parts of the measurement result obtained based on a plurality of parts of the measurement configuration, and a plurality of measurements corresponding to the plurality of parts of the measurement result is performed within a same time period.

10. The apparatus of claim 9,
wherein the first device comprises a packet data convergence protocol (PDCP) layer, and
wherein the second device comprises a radio link control (RLC) protocol layer.

11. The apparatus of claim 9, wherein the type of measurement result includes a master node (MN) split measurement, a secondary node (SN) split measurement, a measurement between MN and SN, a central unit (CU) side measurement, a distribution unit (DU) side measurement, a measurement between CU and DU, a correlation measurement, a quality of service (QoS) flow identifier, a target 5G Qos identifier (5QI), or a mapped 5QI information.

12. The apparatus of claim 9,
wherein the first device includes a master node (MN) or a central unit (CU), and
wherein the second device includes a secondary node (SN) or a distribution unit (DU).

13. An apparatus for wireless communication comprising a processor, configured to implement a method comprising:
receive, by a second device from a first device, a measurement configuration and a type of measurement result,
wherein the measurement configuration and the type of measurement result are based on another measurement configuration for minimization of drive test (MDT) related measurement; and
send, by the second device to a measurement result collection device, a measurement result based on the measurement configuration,
wherein the measurement result includes a time stamp to correlate measurement results obtained by at least one of the first device or the second device based on the time stamp and the type of measurement result, and the type of measurement result,
wherein the measurement result is split into a plurality of parts of the measurement result obtained based on a plurality of parts of the measurement configuration, and a plurality of measurements corresponding to the plurality of parts of the measurement result is performed within a same time period.

14. The apparatus of claim 13,
wherein the first device comprises a packet data convergence protocol (PDCP) layer, and
wherein the second device comprises a radio link control (RLC) protocol layer.

15. The apparatus of claim 13, wherein the type of measurement result includes a master node (MN) split measurement, a secondary node (SN) split measurement, a measurement between MN and SN, a central unit (CU) side measurement, a distribution unit (DU) side measurement, a measurement between CU and DU, a correlation measurement, a quality of service (QoS) flow identifier, a target 5G Qos identifier (5QI), or a mapped 5QI information.

16. The apparatus of claim 13,
wherein the first device includes a master node (MN) or a central unit (CU), and
wherein the second device includes a secondary node (SN) or a distribution unit (DU).

17. A non-transitory computer readable program storage medium having code stored thereon, the code, when executed by a processor, causing the processor to implement a method, comprising:
receiving, by a first device, a measurement configuration for minimization of drive test (MDT) related measurement;
sending, by the first device to a measurement result collection device, a measurement result based on a first measurement configuration determined based on the measurement configuration for MDT related measurement,
wherein the measurement result includes a time stamp and a type of measurement result to correlate measurement results obtained by at least one of the first device or a second device based on the time stamp and the type of measurement result,
wherein the first measurement configuration and the type of measurement result are based on the measurement configuration for MDT; and
sending, by the first device to the second device, a second measurement configuration determined based on the measurement configuration for MDT related measurement, and the type of measurement result,
wherein the second measurement configuration is based on the measurement configuration for MDT related measurement,
wherein the measurement result is split into a plurality of parts of the measurement result obtained based on a plurality of parts of the measurement configuration, and a plurality of measurements corresponding to the plurality of parts of the measurement result is performed within a same time period.

18. The non-transitory computer readable program storage medium of claim 17, wherein the first device comprises a packet data convergence protocol (PDCP) layer, and wherein the second device comprises a radio link control (RLC) protocol layer.

19. The non-transitory computer readable program storage medium of claim 17, wherein the type of measurement result includes a master node (MN) split measurement, a secondary node (SN) split measurement, a measurement between MN and SN, a central unit (CU) side measurement, a distribution unit (DU) side measurement, a measurement between CU and DU, a correlation measurement, a quality of service (QoS) flow identifier, a target 5G Qos identifier (5QI), or a mapped 5QI information.

20. The non-transitory computer readable program storage medium of claim 17,
wherein the first device includes a master node (MN) or a central unit (CU), and
wherein the second device includes a secondary node (SN) or a distribution unit (DU).

* * * * *